United States Patent

Lynn

Patent Number: 5,388,783
Date of Patent: Feb. 14, 1995

[54] ECHO EXHANCING DECOY

[75] Inventor: Howard F. Lynn, Lexington, Mass.

[73] Assignee: Raytheon Company, Lexington, Mass.

[21] Appl. No.: 65,680

[22] Filed: Aug. 10, 1979

[51] Int. Cl.⁶ ............................................. F41G 7/00
[52] U.S. Cl. ................................................ 244/3.14
[58] Field of Search ..................... 345/18 E; 244/3.13, 244/3.14, 3.19

[56] References Cited

U.S. PATENT DOCUMENTS

| | | | |
|---|---|---|---|
| 3,0125,096 | 12/1961 | Deloraine et al. | 343/18 E |
| 2,489,273 | 11/1949 | Bodington | 343/18 E |
| 2,706,773 | 4/1955 | Dodington | 343/18 E |
| 3,007,159 | 10/1961 | Dodington | 343/18 E |
| 3,258,771 | 6/1966 | Harpster | 343/18 E |
| 3,618,096 | 11/1971 | Schoneborn | 343/18 E |
| 3,631,485 | 12/1971 | Beazell, Jr. | 244/3.13 |
| 3,891,989 | 6/1975 | Barney et al. | 343/18 E |
| 4,117,484 | 9/1978 | Shizume | 343/18 E |
| 4,159,478 | 6/1979 | Jaklitsch et al. | 343/18 E |

Primary Examiner—Salvatore Gangialosi
Attorney, Agent, or Firm—Donald F. Mofford

[57] ABSTRACT

A method of interdicting a guided missile equipped with an active radar-controlled guidance system is shown to include generating decoy signals in a transponder on an decoy launched from a ship being attacked, such decoy signals being formed by amplifying echo signals from the ship to cause the apparent position of the ship (as measured by the active radar-controlled guidance system) to differ from the actual position of the ship so that the guided missile ultimately is caused to miss the ship.

2 Claims, 2 Drawing Sheets

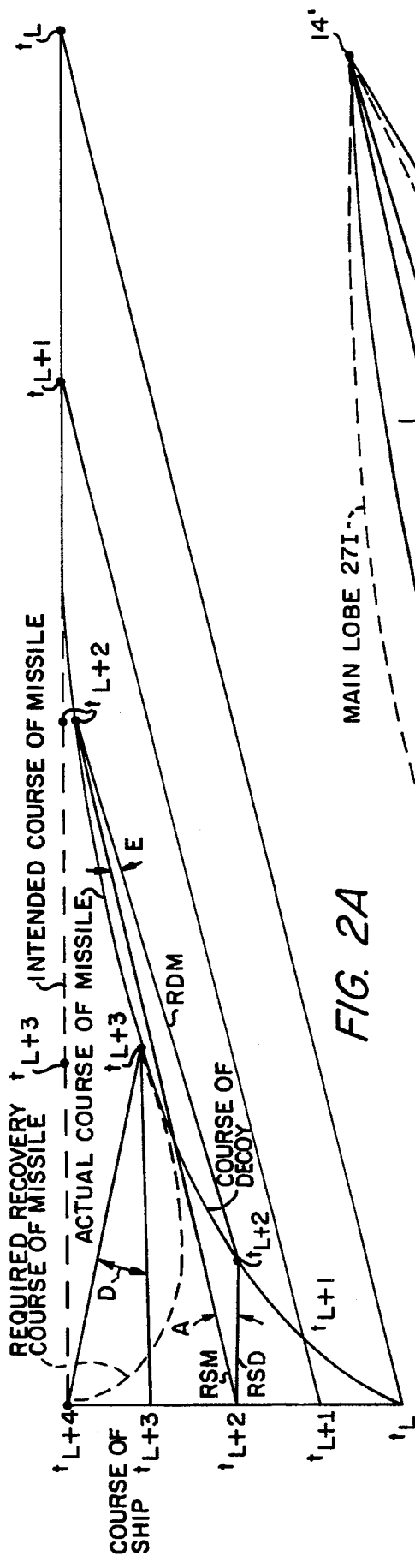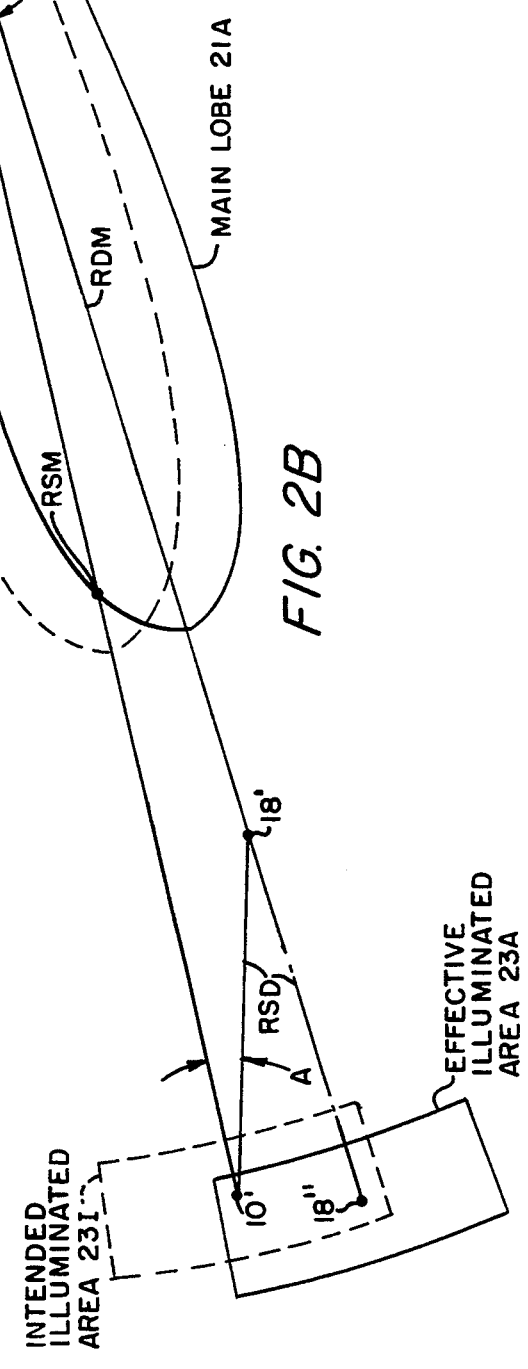

{"1"}

ECHO EXHANCING DECOY

BACKGROUND OF THE INVENTION

This invention pertains generally to missile control systems and particularly to a system of such type used to interdict a guided missile in flight toward a target.

It has been known for some time that so-called "repeater" jammers carried on an expendable decoy may effectively be employed to protect a target against a radar-controlled guided missile. Briefly, such a jammer includes a responder which produces signals that are, substantially, replicates of the echo signals from a target to be protected except that the amplitude, or apparent origin, or some other significant characteristic of such replicates differ from the echo signals from the target to be protected. As a result, the guidance system on the attacking missile is caused to track the decoy rather than the target to be protected.

It is apparent that, if successful diversion of a radar-controlled guided missile from a target to be protected is to be effected, "tracking" on the decoy must be maintained until the guided missile cannot be maneuvered to impact on the target intended to be protected. The requisite deception is, however, difficult to achieve because guidance systems for attacking missiles are now designed to distinguish between echo signals from a target and signals from a decoy whenever the signals from the latter differ to an appreciable degree from a predetermined norm. That is to say, if any one of the many parameters (such as power level, pulse shape, angle, or range rate, to mention a few) of signals from a decoy differs substantially from what may be expected from a target, a modern guidance system will soon recognize the presence of the decoy. In all probability, then, sufficient time will still be available for the attacking missile to be guided to impact on the target desired to be protected.

SUMMARY OF THE INVENTION

With the foregoing background of the invention in mind, it is a primary object of this invention to provide an improved decoy adapted to utilize the signals transmitted by an attacking missile and the echo signals from a target to be protected to divert such missile from its intended course.

The foregoing and other objects, not mentioned, of this invention are attained generally by providing, in an expendable decoy launchable from a target to be protected toward an attacking missile, (a) a repeater jammer for transmitting amplified echo signals from such target; and (b) flight control means for the decoy for causing the amplified echo signals from the decoy to appear to an attacking missile to have originated at substantially the same range as the target to be protected but from a different direction so that such missile is diverted from its intended course.

BRIEF DESCRIPTION OF THE DRAWINGS

For a more complete understanding of this invention, reference is made to the following description of a preferred embodiment of this invention as shown in the accompanying drawings, wherein:

FIGS. 2A and 2B are sketches showing how a decoy according to this invention is effective to divert an attacking missile from its intended course.

DESCRIPTION OF THE PREFERRED EMBODIMENTS

Figure 1:
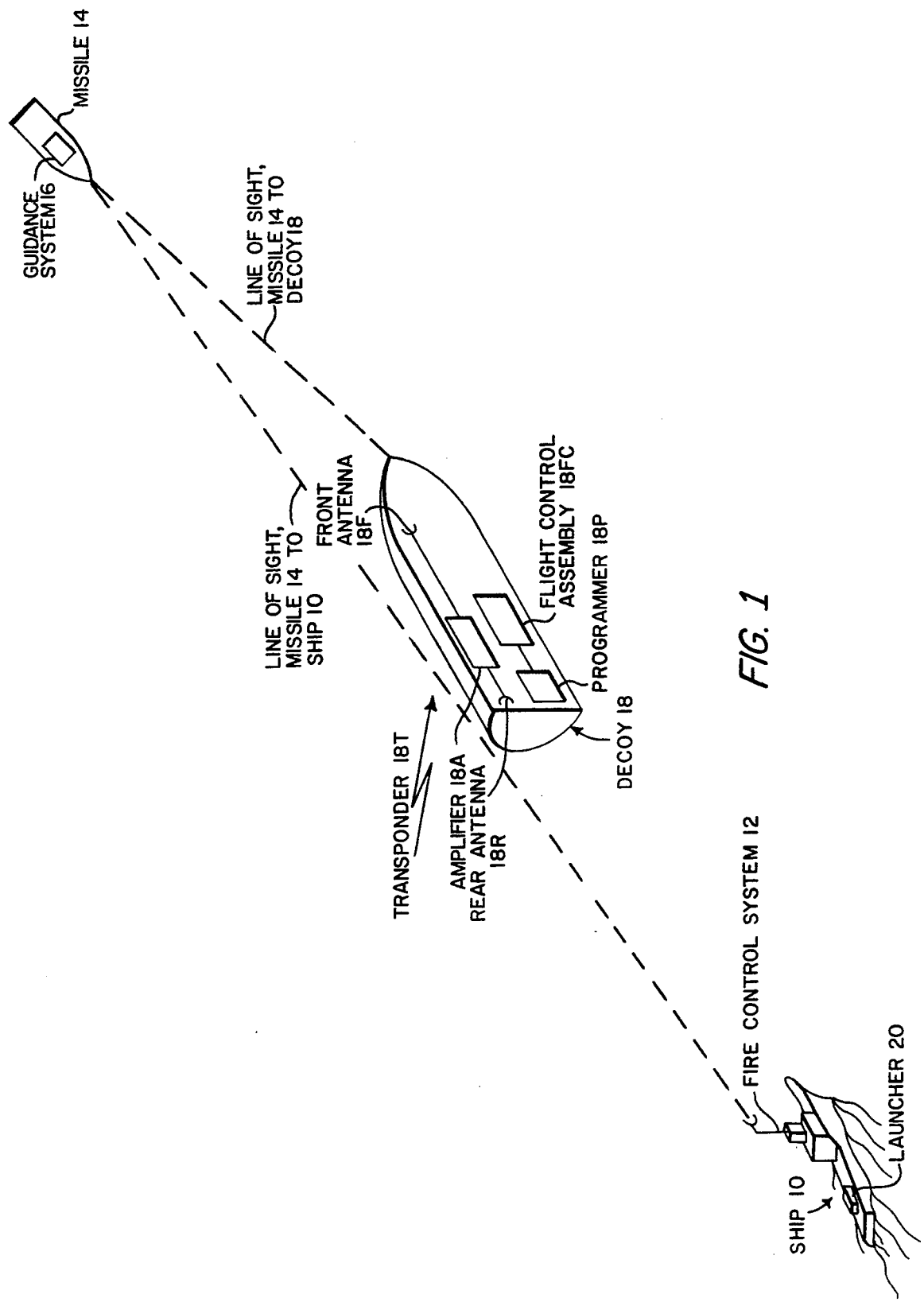
FIG. 1 is a sketch, greatly exaggerated for illustrating purposes, of a tactical situation in which the concepts of this invention are intended to be used.

Referring now to FIG. 1, it will be realized that a target to be protected, here a ship 10, is equipped with any known fire control system 12 (as, for example, a system such as the one shown and described in the copending U.S. patent application entitled "Shipboard Point Defense System", Ser. No. 823,890 filed Jul. 28, 1977 and assigned to the same assignee as this application). Briefly, the just-mentioned system includes a radar for searching the air space around a ship to detect and track any objects, such as a missile 14 (here assumed to be a guided missile equipped with an active radar guidance system 16) on a collision course with the ship 10. The fire control system 12 preferably, but not necessarily, is adapted to determine the probable position of the missile 14 at any future moment. The guidance system 16 on the missile 14 here is assumed to include a radar (not shown) with a beam having a main lobe of finite size initially illuminating the ship 10 to provide echo signals from which guidance commands for the missile 14 are provided in any known manner. For example, the guidance system 16 could be operating under well-known proportional navigation principles whereby the missile 14 is intended to be guided to an intercept with the ship 10 by minimizing the "line of sight" error rate. It will also be assumed that the guidance system 16 also includes signal processing equipment which is adapted to measure various parameters of chosen echo signals normally to allow echo signals from the ship 10 to be separated from unwanted echo signals. Specifically, well-known discriminants such as, for example, range gates, range rate, angle rate and amplitude detectors are assumed to be incorporated in the guidance system 16. Such discriminants also must be satisfied by any decoy before the missile 14 may be diverted from its intended course. Obviously, then, rather stringent requirements are placed on the nature and time of occurrence of any signals from the decoy so that "capture" of the guidance system 16 may be effected in order to divert the missile 14 from its intended course.

The air frame and propulsion means of the decoy 18 here is contemplated to be similar to those of a SEA SPARROW missile, although other types of missiles or drone aircraft could be used so long as the chosen vehicle may be maneuvered in a way to be discussed to reach a position near the line of slight between the ship 10 and the missile 14 (such as indicated at "$t_{L+1}$" in FIG. 2A). That is to say, the chosen missile or drone aircraft here is of a type which may be launched and maneuvered into a position along the line of sight between the missile 14 and the ship 10.

A transponder 18, there simply a rear antenna 18R, an amplifier 18A and a front antenna 18F is provided on the decoy 18 to retransmit echo signals from the ship 10 to the missile 14. It will be recognized that, when the decoy 18 and ship 10 are on the same line of slight from the missile 14, (absent any delay or distortion in the transponder 18T) the retransmitted echo signals (referred to hereinafter as the "decoy signals") at the missile 14 correspond substantially with the echo signals from the ship 10. To put it another way, under such conditions, the time of arrival and the frequency spectrum of the echo signals from the ship 10 are the same as the decoy signals; it is evident, however, that the amplitude of the decoy signals is greater (as a function of the overall gain of the transponder 18T and the geometry existing in any particular situation) than the amplitude of the echo signals. Because the only substantial difference between two signals received at the missile 14 is the difference between the amplitudes of the two, the guidance system 16 is constrained to track the decoy signals.

The decoy 18 is then caused to move away from the line of sight between the missile 14 and the ship 10 to a position such as is illustrated at "$t_{L+2}$" in FIG. 2A. It is noted here that a basic premise of the invention is that echo signals from the ship 10 are provided for amplification in the decoy 18 whether the ship 10 is illuminated by the main lobe of the radar on the missile 14 or a side lobe. This point infers another characteristic of the invention; namely that there is no basic limit to the angle error induced by the process described. Practical error generation is determined by the ratio of echo signal-to-radar noise or to competing sea clutter. The then existing exemplary relationships (shown in FIG. 2B) between the ship, the decoy and the missile (such elements being represented respectively by the numerals 10', 18', 14') obtain. Remembering that the decoy 18' is being tracked by the missile 14' and that the ship 10' and the decoy 18' are not on a common line of sight, it may be seen that the accumulated angle error, E, in the course of the missile 14' is a function of the angle A and, for a given range, $R_{SM}$, between the missile 14' and the ship 10' a function of the ratio between the ranges between the ship 10' and the decoy 18' and between the decoy 18' and the missile 14'. It will also be recognized that the difference between the times of arrival at the missile 14' of the echo signals from the ship 10' and the decoy signals is directly related to the difference between the lengths (measured from the ship 10' to the missile 14') of the paths of the two signals. With the lengths of the paths of the two signals remaining substantially equal, it is impractical to discriminate between the two on a "difference in range" basis.

It will be noted in FIG. 2B that, with the accumulated angle error, E, as shown the main lobe 21A of the radar beam originating at the missile 14' is pointed at the decoy 18' and that an area, designated the effective illuminated area 23A, centered on point 18'' and containing the ship 10' is illuminated. It will be appreciated that sea echoes are returned from points (not indicated) within the effective illuminated area 23A, the size and distribution of such echoes being dependent upon sea conditions and the shape of the main lobe 21A. In contrast, if the ship 10' were being tracked, the main lobe of the radar beam (indicated in broken line and designated main lobe 27I) would be positioned to illuminate an area (designated intended illumination area 23I) centered on the ship 10'. Again, sea echoes, substantially the same as the sea echoes from the effective illuminated area 23A, would also be returned. The amplitude of the echo signals from the ship 10' would, however, be less in the former situation than in the latter by reason of the fact that the full "two-way" gain of the radar antenna is not there achieved. That is to say, the shape of the main lobe 21A and its orientation with respect to the ship 10' may be deemed to cause "two-way" attenuation of any target not on the centerline of the main lobe 21A. On the other hand, in the former situation when the decoy 18' is near the ship 10', the decoy signals are subjected only to "one-way" attenuation. This means, then, that the accumulated angle error, E, may exceed the beamwidth of the main lobe 21A (meaning that the ship 10' may be illuminated by a side lobe (not shown)) and still provide sufficiently high signals to the decoy 18' for adequate decoy signals to be transmitted.

If successful deception of the missile 14' is to be effected, the rate of change of the accumulated angle error, E, and the apparent range rate of the decoy signals must not exceed limits defined by the speed and maneuverability of the ship 10 (FIG. 1). To put it another way, if successful deception is to be effected, the dynamic characteristics of the decoy signals must match the possible characteristics of the ship 10. If matching does not occur the guidance system 16 (FIG. 1) may sense the fact that a true target, i.e. the ship 10, is not being tracked and the guidance system 16 may be caused to search for echo signals from the ship 10 (FIG. 1), disregarding the sensed decoy signals.

Fortunately, with a transponder such as the transponder 18T (FIG. 1) carried close to the line of sight between the ship 10' and the missile 14', the apparent propagation delay of the decoy signals always approximates the actual propagation delay of the echo signals from the ship 10', regardless of any maneuvering of the ship 10' or of the actual position of the decoy 18' in flight toward the missile 14'. Therefore, when the accumulated error, E, begins to approach the width of the antenna beam of the radar sensor 16, a "capture" of the missile 14 occurs resulting in missile 14 homing against a point (the decoy) which is outside the angle resolution cell of the ship.

With the missile 14' tracking the decoy 18' and the two approaching each other head-on (or almost head-on) as shown in FIG. 2A, it is apparent that (say at time $t_{L+3}$), the missile 14' and decoy 18' pass closely to one another. If the missile 14' and decoy 18' were to pass one another, the decoy signals would disappear making it necessary for the guidance system 16 (FIG. 1) to reacquire and to track new target signals, such as echo signals from the ship 10'. Fortunately, however, after a "fly-by" occurs some time must elapse before tracking of the ship 10' may commence and proper correction of the course of the missile 14' effected. Depending upon the then existing pointing error, D, and flight characteristics of the missile 14', it is evident that the range at "fly-by" may be so short that the missile 14' will miss the ship 10'. Additionally, of course, a second decoy could be launched when "fly-by" of the first occurs to ensure a successful deception.

It will be observed that the course of the decoy 18 (FIG. 1) is constrained in any given tactical situation to cause the decoy signals to simulate actual target signals. Fortunately, however, with the positions and velocities of the ship 10 and the missile 14 measured and the flight characteristics of the decoy 18 known, a priori, the particular course to be taken by the decoy 18 in any particular tactical system may be calculated and a programmer 18P (here a conventional read-only memory) may be set up immediately prior to launch to provide the requisite command signals to a conventional flight control assembly 18FC in the decoy 18.

Having described a preferred embodiment of the invention, it will now be apparent to one of skill in the art that many changes may be made without departing from the inventive concepts. For example, as mentioned hereinbefore, it is not essential to the invention that the "Sea Sparrow" airframe be used. As a matter of fact, it may be advantageous to modify the "Sea Sparrow"

airframe, or to provide a different airframe, to optimize the aerodynamic characteristics of the airframe actually used in a decoy according to the invention so that the "fly-by" range (meaning the range from the ship to be protected to the decoy when the latter is proximate to the attacking missile) is such that the attacking missile cannot be maneuvered to impact on the ship to be protected. A moment's thought will make it clear that such a "fly-by" range is relatively short compared to the range at which an attacking missile may be detected. It follows then that a short "fly-by" range may not readily be achieved with a high speed missile carrying a decoy unless such a missile is allowed to close to a short range before the decoy is launched. Obviously, then, the ideal airframe would be one which may be accelerated quickly (as may that of the Sea Sparrow) and then, after capture by the decoy of the guidance system on the attacking missile, be decelerated to a speed comparable to that of the ship to be protected. Such an aerodynamic capability, for example, could be achieved by modifying the "Sea Sparrow" to deploy braking parachutes after launch so that, regardless of the range of the attacking missile when the decoy is launched, "fly-by" would not occur until such missile could not be maneuvered to impact on the ship being protected. It is felt, therefore, that this invention should not be restricted to its disclosed embodiment, but rather should be limited only by the spirit and scope of the appended claims.

What is claimed is:

1. The method of operating a decoy to protect a ship under attack by a guided missile utilizing an active radar to produce echo signals indicative of the position of such ship relative to the guided missile, such echo signals further having unique parameters characterizing the ship, such method comprising the steps of:
   (a) firstly, launching and directing the decoy from the ship under attach to a position along or near the line of sight between such ship and the guided missile;
   (b) secondly, directing the decoy along a course deviating from the line of sight between such ship and the guided missile;
   (c) thirdly, continuously receiving and amplifying the echo signals from such ship to produce decoy signals on the decoy, such decoy signals having substantially the same unique parameters as the echo signals from the ship under attack except having a higher amplitude and an Origin on the line of sight between the decoy and the guided missile; and
   (d) fourthly, transmitting the decoy signals to the guided missile, thereby to cause such missile to be guided to the apparent origin of such decoy signals, such apparent origin ultimately differing from the actual position of such ship.

2. The method as in claim 1 having the additional step of decreasing the speed of the decoy after such decoy is directed to the position along the line of sight between the ship to be protected and the guided missile.

* * * * *